2,933,525
PREPARATION OF TETRACARBOXYLIC ACIDS AND DIKETO-DICARBOXYLIC ACIDS

John B. Braunwarth, Crystal Lake, and Gifford W. Crosby, River Forest, Ill., assignors to The Pure Oil Company, Chicago, Ill., a corporation of Ohio No Drawing. Application December 27, 1957
Serial No. 705,490

21 Claims. (Cl. 260—537)

This invention relates to a method of preparing tetracarboxylic acids and diketo-dicarboxylic acids and, more particularly, to the preparation of these products by the reaction of cycloalkanol hydroperoxides or alkylcycloalkyl hydroperoxides with alpha, beta-unsaturated carboxylic acids under reduction-oxidation conditions.

Many reactions of hydroperoxides are known in the prior art. E. G. E. Hawkins in his article entitled, "Reactions of Organic Peroxides, Part II, Reactions of α,α-Dimethylbenzyl Hydroperoxide ('Iso-Propylbenzene Hydroperoxide')," (J. Chem. Soc. 1950, 2169), shows the decomposition of α,α-dimethylbenzyl hydroperoxide by ferrous sulfate under the influence of various catalysts and under thermal conditions to form mixtures of 2-phenyl-propan-2-ol, acetophenone, and α-methylstyrene. The hydroperoxides were first shown by Hock and Lang, Ber. 77, 257 (1944), to be formed by the oxidation of isopropylbenzene with air to give $Ph \cdot CMe_2OOH$. Improved methods for their preparation are described by Armstrong, Hall and Quin, British Patents 610,293 and 630,286; J. Chem. Soc. 1950, 666. E. G. E. Hawkins and P. P. Young (J. Chem. Soc. 1950, 2804), state that the reaction of methylcyclopentyl hydroperoxide with ferrous sulfate solution gives rise to the formation of dodecane-2,11-dione. However, the use of methylcyclohexyl hydroperoxide gives poorer yields of tetradecane-2,13-dione. N. Brown et al., J. Am. Chem. Soc. 77, 1756 (1955), describe the preparation of "cyclohexanone peroxide" by the autocatalyzed, liquid-phase oxidation of cyclohexanol with oxygen. Reaction of these peroxides with the ferrous ion in hydrocarbon solution is said by Brown et al. to produce a 68% yield of 1,12-dodecanedioic acid. M. S. Kharasch and W. Nudenberg in their article entitled, "Detection of Free Radicals in Solution, III, Formation of Long-Chain, α,ω-Dicarboxylic Acids" (J. Org. Chem. 19, 1921 (1954)), indicate that unsaturated dicarboxylic acids of 20 carbon atoms are formed from cyclohexanone peroxide and butadiene.

The formation of diketones and dibasic acids is assumed to take place by the rearrangement of an alkoxy radical to an open-chain carbon radical, followed by dimerization, thus:

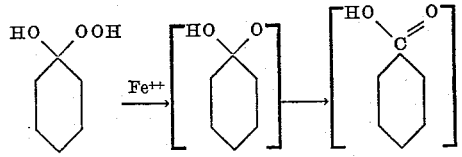

In the case of the $C_{20}$ dicarboxylic acids, the intermediate radical adds to the butadiene before dimerization.

It has been found in accordance with this invention that when compounds of a cyclic structure having a peroxide grouping attached directly to one of the carbon atoms in the cyclic structure, as cycloalkanol hydroperoxide and alkyl cycloalkyl hydroperoxide, are decomposed by the presence of reduction-oxidation conditions in the presence of alpha, beta-unsaturated carboxylic acids, the main products are tetracarboxylic acids or diketo-dicarboxylic acids. The resulting products are useful as intermediates in the preparation of synthetic lubricants, plasticizers, resins and fibers. The primary object of this invention is to provide a method of preparing tetracarboxylic acids and diketodicarboxylic acids, and compositions of matter containing same, by the reaction of alpha-beta-unsaturated carboxylic acids with cyclic peroxides and hydroperoxides under redox conditions.

The reactions involved in the process of this invention may be represented broadly as follows:

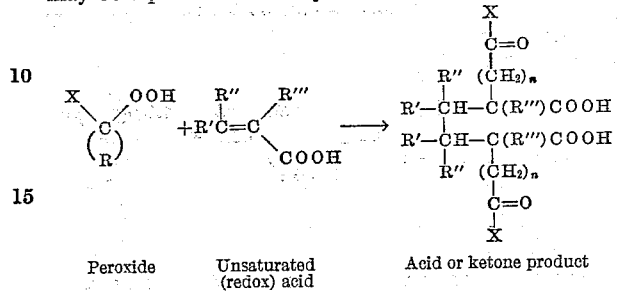

| Peroxide | Unsaturated (redox) acid | Acid or ketone product | wherein X is selected from the group of $C_1$ to $C_6$ alkyl radicals, which may be straight-chain or branched-chain, or a hydroxyl group; R is a divalent organo radical containing from 3 to 9 carbon atoms in the unsubstituted portion of the diradical, and may consist of unsubstituted methylene groups or polymethylene groups, or it may contain one or more substituents of the group consisting of methyl, ethyl, propyl, isopropyl, butyl, isobutyl, benzyl, phenyl, cyclohexyl, chloro, fluoro, hydroxy, or alkoxy groups such as methoxy; R' may be an alkyl radical containing from 1 to 6 carbon atoms or may be an aryl group i.e., the phenyl group or an alkaryl group; R'' and R''' may be hydrogen or alkyl radicals containing from 1 to 6 carbon atoms or may be an aryl group, or an alkaryl group; and n is an integer of from 3 to 9. From this definition, it is seen that when X is an alkyl group, the end product is a diketo-dicarboxylic acid and when X is the hydroxyl group, the end product is a tetracarboxylic acid. In each instance the number of carbon atoms in the divalent R group governs the value of n in the end product. Examples of $C_1$ to $C_6$ alkyl groups included in the definition X are methyl, ethyl, propyl, isopropyl, butyl, isobutyl, tertiary butyl, pentyl, isopentyl, hexyl and isohexyl groups.

Examples of R groups in the above equations and formula include:

$-(CH_2)_3-$, $-(CH_2)_4-$, $-(CH_2)_5-$, $-(CH_2)_6-$,
$-(CH_2)_9-$, $-CH_2CH(CH_3)CH_2CH_2-$,
$-CH_2CH_2CH_2C(CH_3)_2-$

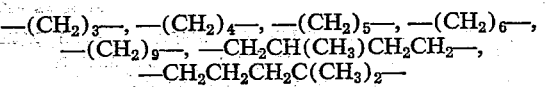

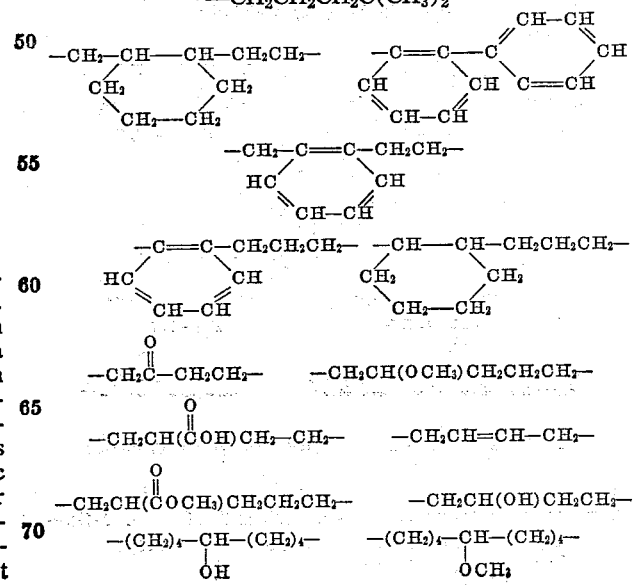

The preferred R groups are trimethylene, tetramethylene, pentamethylene and hexamethylene groups; since the carbon atom attaching to the X group and to the OOH group is not included in the definition of R, the number of carbon atoms in the cyclic group becomes 4 to 10.

The peroxide or hydroperoxide starting materials used in this invention are well known and their properties fairly well defined. The term "peroxide compound" will be used herein to broadly cover compounds of formulas set forth above and to include compounds which in a strict sense are defined as hydroperoxides. The preferred starting materials are the peroxides of the type obtainable by treating cycloalkanols or alkyl cycloalkanes with oxygen or by the reaction of cycloalkanones with hydrogen peroxide. Examples are the peroxide compounds obtained by reacting hydrogen peroxide with cyclopentanone and cyclohexanone where R is $-(CH_2)_4-$ and $-(CH_2)_5-$, respectively, particularly the reaction products of hydrogen peroxide and cycloalkanones and the oxidation products of cycloalkanols and alkyl cycloalkanes. Following the above definitions for R and X, these products include cyclopentanone peroxide, cyclohexanone peroxide, cycloheptanone peroxide, methylcyclohexane hydroperoxide, ethylcyclopentane hydroperoxide, etc. The alpha, beta-unsaturated carboxylic acids used as reactants in accordance with this invention include the following unsaturated acids:

Crotonic acid, iso-crotonic acid, 2-hexenoic acid, cinnamic acid, beta-ethyl acrylic acid, beta-beta-dimethyl acrylic acid, angelic acid and its isomer tiglic acid, isohydrosorbic acid and homologs thereof having alpha, beta unsaturation. Those acids, such as acrylic and methyl acrylic, having a terminal methylene group are excluded because of the ease with which they polymerize.

The use of reduction-oxidation conditions is essential to convert the peroxide compounds to the diketo-dicarboxylic acid or tetracarboxylic acid products by reaction with the alpha-beta unsaturated carboxylic acids. The term "redox" is used herein in its widely accepted sense to designate a reduction-oxidation system wherein an electron transfer takes place with the simultaneous formation of a free radical. In order for this transfer to take place, it is necessary that there be present in the reaction mixture a substance or substances which acts as a reducing agent for the peroxide compound. Those heavy metals which are capable of existing in several valence states such as iron, chromium, manganese, cobalt, copper and molybdenum are suitable reducing agents for this purpose when they are in their lower valence states. Certain organic and inorganic compounds may also be used such as sodium bisulfate, the reducing sugars, 1-ascorbic acid, sodium formaldehyde sulfoxylate and other reducing agents which are commonly known and used in the redox art.

The invention will be illustrated by a number of examples using the ferrous ion as the redox agent; however, it is not to be limited thereby and any of the aforegoing reducing agents may be used, or other reducing agents as are known in the prior art. In general, when using a heavy metal such as the ferrous ion, the amount of the ion is equivalent to or in excess of the amount of peroxide to be reacted. The heavy metal ions also may be used in trace amounts as promoters with any one of the aforementioned reducing agents, which serve to convert ferric ions to the ferrous ion as fast as the ferric ion is produced. Because of low cost, availability and efficiency, the ferrous ion is preferred for the reaction. Since this reaction does not involve dimerization, it is not necessary to exclude oxygen from the reaction system.

The reaction of this invention for the conversion of cyclic peroxide compounds to the diketo-dicarboxylic acids or the tetracarboxylic acids can be carried out in various solvents such as water, methanol, ethanol, tertiary butanol, aromatic solvents, ethers, esters, ketones, dioxane or other solvent mixtures. The reaction may also be carried out in the emulsion state. Pressures above or below atmospheric may be used. Pressures higher than atmospheric are advantageous where a relatively volatile solvent is used in the liquid phase. In general, the reaction proceeds at atmospheric pressure and at temperatures in the range of $-100°$ C. to $100°$ C. The preferred temperature range is $-30°$ C. to $60°$ C.

In order to illustrate the invention, a number of examples are given:

*Example I*

This example describes the reaction of "cyclohexanone peroxide" and crotonic acid to form 7,8-dimethyltetradecane - 1,6,9,14 - tetracarboxylic acid. "Cyclohexanone peroxide" (0.49 mole) in 750 cc. of methyl alcohol was cooled to 0° C., and 43 gm. (0.5 mole) of crotonic acid were added, with stirring. A solution containing 147 gm. (0.53 mole) of ferrous sulfate heptahydrate, 25 cc. of concentrated sulfuric acid and 250 cc. of distilled water was added dropwise to the reaction mixture over a period of 2 hours.

After standing overnight, the reaction mixture was diluted with 750 cc. of water and the organic phase which separated was collected. The aqueous alcohol solution was extracted with a 75–25 mixture of benzene and ether, respectively. The combined organic phases were then water-washed until neutral to litmus, and distilled to remove ether and benzene. The residue was then distilled under water-pump vacuum to remove unreacted cyclohexanone (the cyclohexanone peroxide used in this reaction was prepared in an excess of cyclohexanone). In order to assure complete esterification, the remaining residue was diluted with 100 cc. of methyl alcohol, 7.5 gm. of p-toluene sulfonic acid was added as catalyst, and the mixture was refluxed for five and a half hours. Thereafter, mixture was diluted with 100 cc. of distilled water and extracted with benzene. The combined benzene extraction phases were water-washed until neutral to litmus, dried over $CaSO_4$, and filtered.

Using a six-inch Vigreaux column, the methyl ester of the crude polybasic acid was collected through a B. Pt. range of 170° to 220° C., at approximately 0.001 mm. The weight of product recovered was 30.1 gm., representing a yield of 26 mole percent, based on the hydroperoxide.

Calc. for $C_{24}H_{42}O_8$: mol. wt. $-458$; sap. No. $-487$; Br. No. $-0$. Found: mol. wt. $-460$; sap. No. $-431$; Br. No. $-3.2$.

Saponification of this product followed by acidification gave the desired 7,8-dimethyltetradecane-1,6,9,14-tetracarboxylic acid.

*Example II*

This example describes the reaction of 1-methylcyclopentyl-1-hydroperoxide and crotonic acid to form 2,15-dioxo-8,9-dimethylhexadecane-7,10-dicarboxylic acid. To a stirred solution of 35 cc. of distilled water, 16.7 gm. (0.06 mole) of ferrous sulfate heptahydrate, 7 cc. of concentrated sulfuric acid, 40 cc. of ethanol and 3.0 gm. of crotonic acid was added dropwise a solution of 10 cc. of ethanol, 2.5 gm. of crotonic acid and 6.5 gm. of crude 1-methylcyclopentyl-1-hydroperoxide. The time for addition was approximately 30 minutes, and moderate cooling with an ice-bath was used. After the addition was completed, stirring was continued for 1 hour, after which the reaction mixture was transferred to a separatory funnel and extracted three times with 100-cc. portions of ether. The combined ether-extraction phases were then water-washed two times with 100-cc. portions of distilled water, dried over $CaSO_4$, filtered, and distilled under water-pump vacuum to remove the ether.

Unreacted crotonic acid was removed by conversion of the reaction product to the ethyl ester, followed by distillation to remove ethyl crotonate, as follows. To the residue was added 25 cc. of ethyl alcohol and 1 gm. of p-toluene sulfonic acid as catalyst, and the mixture was refluxed for 22 hours. Thereafter, the mixture was diluted with 50 cc. of distilled water, and the organic ester phase was extracted with benzene. The combined benzene extraction phases were water-washed until neutral. To prevent decomposition of the higher boiling products and assure complete removal of ethyl crotonate, 11 cc. of dodecane were added and the mixture was distilled to remove benzene and ethyl crotonate. Distillation was halted at 75° C. at 30 mm. pressure.

The desired product was separated from the residual, unreacted organic materials by the addition of 20 cc. of ethyl alcohol plus 7 gm. of sodium hydroxide dissolved in 10 cc. of water to the distillation residue, and refluxing the mixture for 18 hrs. Thereafter, the ethyl alcohol was removed by distillation and organic impurities (ketone and dodecane) were extracted by washing with four 25-cc. portions of ether. The alkaline water phase was then acidified with dilute hydrochloric acid, and the organic acid was extracted by washing with four 25-cc. portions of ether. The ether phase was water-washed, and the ether was evaporated, leaving a keto-acid believed to be 2,15-dioxo-8,9-dimethylhexadecane-7,10-dicarboxylic acid.

*Example III*

Following the procedure of Example I, 0.49 mole of cyclohexanol hydroperoxide in methyl alcohol solution was cooled to 0° C., and 43.0 gm. (0.5 mole) of acrylic acid were added, with stirring. A solution containing 147 gm. (0.53 mole) of ferrous sulfate heptahydrate, 25 cc. of concentrated sulfuric acid and 250 cc. of distilled water was added dropwise to the reaction mixture over a period of about 2 hours. Attempts to separate a residue after the reaction had stood overnight were unsuccessful. A polymeric product resulted indicating that acrylic acid, having a terminal methylene group, has too great a tendency to enter into competing reactions.

*Example IV*

In accordance with the procedure set forth in Example I, the reaction of the same quantities of 2-hexenoic acid with cyclohexanol hydroperoxide yields, under the same conditions, 7,8-dipropyltetradecane-1,6,9,14-tetracarboxylic acid.

*Example V*

The reaction of the same quantities of alpha-methyl acrylic acid with cyclohexanol hydroperoxide, in accordance with the procedure described in Example I, under the same conditions, yields a polymeric product as in Example III.

*Example VI*

By reacting the same quantities of beta-ethyl acrylic acid with cyclohexanol hydroperoxide under the conditions and procedure set forth in Example I, there is produced, in good yields, 7,8-diethyltetradecane-1,6,9,14-tetracarboxylic acid.

*Example VII*

In accordance with the procedure set forth in Example I, the reaction of the same quantities of beta-beta-dimethyl acrylic acid with cyclohexanol hydroperoxide yields, under the same conditions 7,7,8,8-tetramethyl-tetradecane-1,6,9,14-tertacarboxylic acid.

*Example VIII*

The reaction of the same quantities of angelic acid with cyclohexanol hydroperoxide, in accordance with the procedure in Example I, and under the same conditions, gives good yields of 6,7,8,9-tetramethyltetradecane, 1,6,9,14-tetracarboxylic acid.

*Example IX*

By reacting 2-hexenoic acid with 1-methylcyclopentyl-1-hydroperoxide, in accordance with the procedure of Example II, good yields of 2,15-dioxo-8,9-dipropylhexadecane, 7,10-dicarboxylic acid are obtained.

*Example X*

The reaction of alpha-methyl acrylic acid with 1-methylcyclopentyl-1-hydroperoxide, in accordance with the procedure of Example I, produces a polymer.

*Example XI*

The reaction of beta-ethyl acrylic acid in the quantities and under the conditions called for in Example II, with 1-methylcyclopentyl-1-hydroperoxide, produces good yields of 2,15-dioxo-8,9-diethylhexadecane, 7,10-dicarboxylic acid.

*Example XII*

The reaction of beta-beta-dimethyl acrylic acid in the quantities and under the conditions called for in Example II with 1-methylcyclopentyl-1-hydroperoxide, produces good yields of 2,15-dioxo-8,8,9,9-tetramethylhexadecane, 7,10-dicarboxylic acid.

*Example XIII*

The reaction of the same quantities of angelic acid with 1-methylcyclopentyl-1-hydroperoxide, in accordance with the procedure of Example II and under the same conditions, gives good yields of 2,15-dioxo-7,8,9,10-tetramethylhexadecane, 7,10-dicarboxylic acid.

*Example XIV*

Cinnamic acid and 4-methylcyclohexanol hydroperoxide, when brought together in the quantities and under the conditions specified in Example I, produces good yields of 3,12-dimethyl-7,8-diphenyltetradecane-1,6,9,14-tetracarboxylic acid.

*Example XV*

The reaction of equivalent portions of cinnamic acid and 1-methylcyclopentyl-1-hydroperoxide in accordance with the directions set forth in Example II, yields 2,15-dioxo-8,9-diphenylhexadecane, 7,10-dicarboxylic acid.

From the foregoing examples, it is apparent that when using such unsaturated acids as alpha-methyl acrylic acid and angelic acid, which have an alkyl group attached to the alpha carbon atom, in addition to having alkyl groups attached to the beta carbon atom, the end product, whether a diketodicarboxylic acid or a tetracarboxylic acid, will also contain alkyl groups attached to the same carbon atom. Thus, the invention encompasses those compounds coming within the general formula which contain alkyl groups attached to either or both of the original alpha and beta carbon atoms of the unsaturated acid reactant. The unsaturated acid reactant contains at least one hydrogen atom attached to one or the other of the alpha and beta carbon atoms as in beta,beta-dimethyl acrylic acid and angelic or tiglic acid, or may contain one hydrogen atom attached to each of the alpha and beta carbon atoms, as in crotonic acid, cinnamic acid, 2-hexanoic acid, beta-ethyl acrylic acid, etc.

The reactions described herein may be carried out batchwise or continuously and mixed reactants may be used. In general, however, where it is desired to transform the end products to salts or esters, it is preferred that only single products be made. Since the peroxide or hydroperoxide reactants are sensitive to shock, the usual precautions should be taken to avoid an explosion. The reaction is best carried out in a sealed or tubular reactor with the cold peroxide compound being fed therein to mix with the acid reactant, redox reducing agent and solvent. Other techniques may be used without departing from the spirit of the invention. Although sulfuric acid has been used as the mineral acid, other acids such as nitric acid, the haloacids, acetic acid, chloroacetic acid and equivalent acids may be used.

The reaction is carried out merely by mixing the reactants in the presence of the redox reducing agent, which contacting is facilitated by the use of a solvent. In general, the reactants are brought together in amounts such that the unsaturated acid is present in at least the stoichiometric amount needed to react with all of the peroxide and preferably in a slight excess, i.e., about 0.01 to 0.10 mole excess. The redox reducing agent and mineral acid may be mixed with water and the combination added to the solvent containing the peroxide and unsaturated acid. The rate of mixing is controlled by slow addition, agitation and the heat of reaction dissipated by cooling. An amount of mineral acid is added to maintain a distinctly acid solution which will require about 50 cc. of concentrated acid per mole of total reactants. When the ferrous ion is the reducing agent, methanol is the preferred solvent. When water-soluble ferrous salts are used, the reaction may be carried out in an aqueous alcoholic medium in which contact between the two liquid phases is maintained by stirring. The products are removed by solvent extraction and may be further purified by conversion to salts and removal of neutral organic materials, followed by regeneration of free acid with mineral acid, or by ion-exchange techniques. The ferric ion by-product of the reaction can be recovered by precipitation, ion-exchange, or by reduction and recycling to the process.

What is claimed is:

1. The process which comprises converting a compound of the general formula (I) 

into a compound of the general formula (II) 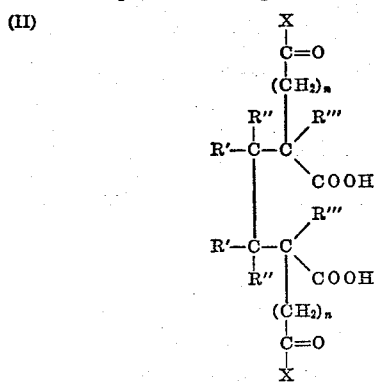

wherein in said formulas, X is a substituent selected from the group of hydroxyl and alkyl groups of 1 to 6 carbon atoms, R is an alkylene radical containing from 3 to 9 carbon atoms, R' is selected from the group consisting of alkyl groups containing 1 to 6 carbon atoms and a phenyl group, R" and R''' may be the same or different radicals selected from the group consisting of hydrogen, alkyl groups containing from 1 to 6 carbon atoms, and $n$ is an integer of from 3 to 9, by condensing compounds of Formula I with an alpha-beta unsaturated carboxylic acid of the formula (III) 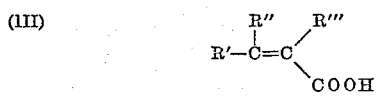

wherein R', R" and R''' are radicals as herein defined, said condensation reaction being conducted in the presence of a redox reducing agent and separating compounds of Formula II from the resulting reaction mixture.

2. The process in accordance with claim 1 in which said reaction is conducted in the presence of a redox reducing agent comprising a heavy metal ion capable of existing in several valence states and by the use of temperatures ranging from about —100° C. to 100° C.

3. The process in accordance with claim 1 in which the heavy metal ion is selected from the group consisting of the ferrous ion, chromous ion, manganous ion, cobaltous ion, and the cuprous ion, same being obtained from salts of these metals.

4. The process in accordance with claim 1 in which R is selected from the group of tetramethylene and pentamethylene groups.

5. The process in accordance with claim 1 in which X is an hydroxyl group and said compound of Formula II is a tetracarboxylic acid.

6. The process in accordance with claim 1 in which X is an alkyl group and said compound of Formula II is a diketo-dicarboxylic acid.

7. The process in accordance with claim 1 in which R' is an alkyl group having 1 to 6 carbon atoms, and R" and R''' are hydrogen.

8. The process in accordance with claim 1 in which R' is a phenyl group and R" and R''' are hydrogen.

9. The process in accordance with claim 1 in which R' is a methyl group and R" and R''' are hydrogen.

10. The process in accordance with claim 1 in which R' is an ethyl group and R" and R''' are hydrogen.

11. The process which comprises converting a compound of the general formula (I) 

into a compound of the general formula (II) 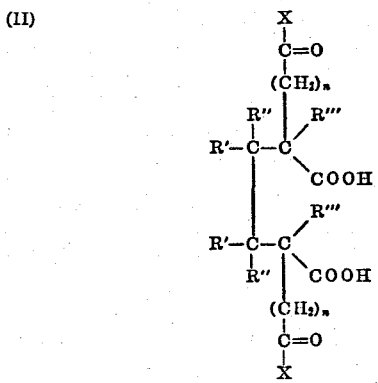

wherein in said formulas, X is a substituent selected from the group of hydroxyl and alkyl groups of 1 to 6 carbon atoms, R is an alkylene radical containing from 3 to 9 carbon atoms, R' is selected from the group consisting of alkyl groups containing 1 to 6 carbon atoms, and the phenyl group, R" and R''' may be the same or different radicals selected from the group consisting of hydrogen, alkyl groups, containing from 1 to 6 carbon atoms, and $n$ is an integer of from 3 to 9, by condensing compounds of Formula I with an alpha-beta unsaturated carboxylic acid of the formula (III) 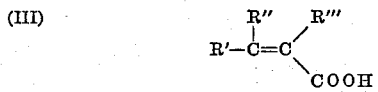

wherein R', R" and R''' are radicals as herein defined, said condensation reaction being conducted in the presence of a redox reducing agent comprising a heavy metal ion capable of existing in several valence states and at a temperature between about —100° C. to 100° C. in the presence of a mineral acid.

12. The process in accordance with claim 11 in which the heavy metal ion is selected from the group consisting of the ferrous ion, chromous ion, manganous ion, cobaltous ion, and the cuprous ion, same being obtained from salts of these metals.

13. The process in accordance with claim 12 in which said heavy metal ion is the ferrous ion and said reaction is conducted in the presence of sulfuric acid.

14. The process in accordance with claim 11 in which R is selected from the group of tetramethylene and pentamethylene groups.

15. The process in accordance with claim 11 in which the compound of Formula I is cyclohexanone peroxide, the compound of Formula II is crotonic acid and the end product is 7,8-dimethyltetradecane-1,6,9,14-tetracarboxylic acid.

16. The process in accordance with claim 11 in which the compound of Formula I is 1-methylcyclopentyl-1-hydroperoxide, the compound of Formula II is crotonic acid and the end product is 2,15-dioxo-8,9-dimethylhexadecane-7,10-dicarboxylic acid.

17. The process in accordance with claim 11 in which the compound of Formula I is cyclohexanol peroxide, the compound of Formula II is 2-hexenoic acid and the end product is 7,8-di-n-propyltetradecane-1,6,9,14-tetracarboxylic acid.

18. The process in accordance with claim 11 in which the compound of Formula I is 1-methyl cyclopentyl-1-hydroperoxide, the compound of Formula II is 2-hexenoic acid and the end product is 2,15-dioxo-8,9-di-n-propyl,7,10-dicarboxylic acid.

19. 7,8-dimethyl tetradecane - 1,6,9,14-tetracarboxylic acid.

20. 2,15-dioxo-8,9 - dimethylhexadecane - 7,10 - dicarboxylic acid.

21. 7,8-di-n-propyltetradecane-1,6,9,14 - tetracarboxylic acid.

References Cited in the file of this patent

UNITED STATES PATENTS

| | | |
|---|---|---|
| 2,584,527 | Albisetti et al. | Feb. 5, 1952 |
| 2,811,551 | Coffman et al. | Oct. 29, 1957 |
| 2,820,813 | Smith | Jan. 21, 1958 |

UNITED STATES PATENT OFFICE
CERTIFICATE OF CORRECTION

Patent No. 2,933,525                      April 19, 1960

John B. Braunwarth et al.

It is hereby certified that error appears in the printed specification of the above numbered patent requiring correction and that the said Letters Patent should read as corrected below.

Column 1, lines 53 to 59, the equation should appear as shown below instead of as in the patent:

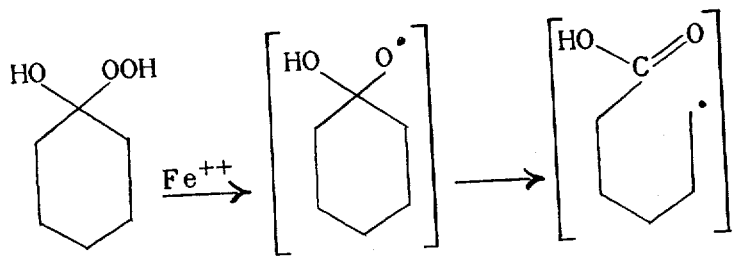

Signed and sealed this 10th day of January 1961.

(SEAL)
Attest:

KARL H. AXLINE
Attesting Officer

ROBERT C. WATSON
Commissioner of Patents